(12) United States Patent
Bellamkonda et al.

(10) Patent No.: US 11,061,895 B2
(45) Date of Patent: Jul. 13, 2021

(54) ADAPTIVE GRANULE GENERATION FOR PARALLEL QUERIES WITH RUN-TIME DATA PRUNING

(71) Applicant: Oracle International Corporation, Redwood Shores, CA (US)

(72) Inventors: Srikanth Bellamkonda, Mountain View, CA (US); Yi Pan, Hangzhou (CN); Kavya Shankar, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 188 days.

(21) Appl. No.: 16/039,238

(22) Filed: Jul. 18, 2018

(65) Prior Publication Data
US 2020/0026788 A1    Jan. 23, 2020

(51) Int. Cl.
*G06F 16/2453*    (2019.01)
*G06F 16/27*    (2019.01)
*G06F 16/2455*    (2019.01)

(52) U.S. Cl.
CPC .... *G06F 16/24532* (2019.01); *G06F 16/2456* (2019.01); *G06F 16/24542* (2019.01); *G06F 16/24549* (2019.01); *G06F 16/278* (2019.01)

(58) Field of Classification Search
CPC ......... G06F 16/24532; G06F 16/24542; G06F 16/24549; G06F 16/2456; G06F 16/278; G06F 9/3877
See application file for complete search history.

(56) References Cited

U.S. PATENT DOCUMENTS

| | | | | |
|---|---|---|---|---|
| 2003/0177240 A1* | 9/2003 | Gulko | ............... | G06F 9/5038 709/226 |
| 2006/0182046 A1* | 8/2006 | Dageville | ........... | G06F 9/4494 370/260 |
| 2008/0147599 A1* | 6/2008 | Young-Lai | ........ | G06F 16/24532 |
| 2009/0019007 A1* | 1/2009 | Niina | ............... | G06F 16/24542 |
| 2009/0182726 A1* | 7/2009 | Wang | ............... | G06F 16/90335 |
| 2011/0213775 A1* | 9/2011 | Franke | ............... | G06F 16/278 707/737 |

(Continued)

*Primary Examiner* — James Trujillo
*Assistant Examiner* — Michal Bogacki
(74) *Attorney, Agent, or Firm* — Hickman Becker Bingham Ledesma LLP

(57) ABSTRACT

Techniques herein improve computational efficiency for parallel queries with run-time data pruning by using adaptive granule generation. In an embodiment, an execution plan is generated for a query to be executed by a plurality of slave processes, the execution plan comprising a plurality of plan operators. For a first plan operator of the plurality of plan operators, a first set of work granules is generated, and for a second plan operator of the plurality of plan operators, a second set of work granules is generated. A first subset of slave processes of the plurality of slave processes is assigned the first set of work granules. Based on the execution of the first set of work granules by the first subset of slave processes, a bloom filter is generated that specifies for which of said first set of work granules no output rows were generated. Based on the bloom filter, the second set of work granules is modified and the modified second set of work granules is assigned to a second subset of slave processes and executed.

18 Claims, 6 Drawing Sheets

Departments 202

| Dept_No | Dept_Name |
|---|---|
| 1 | Accounting |
| 2 | Sales |
| 5 | Shipping |
| 6 | Legal |
| 7 | Operations |

Employees 204

| Dept_No | Employee_Name |
|---|---|
| 0 | James Johnson |
| 1 | Janie Smith |
| 2 | Julian Ropes |
| 3 | Michael Miller |
| 4 | Jeff Zacks |
| 5 | John Dock |
| 6 | Marquis Moody |
| 7 | Elaine Longoria |
| 8 | Alex Marks |
| 9 | Bart Blocks |
| 10 | Patricia Pear |
| 11 | Tamfany Wankle |

(56) References Cited

U.S. PATENT DOCUMENTS

| | | | |
|---|---|---|---|
| 2012/0078951 A1* | 3/2012 | Hsu | G06F 16/24532 |
| | | | 707/769 |
| 2012/0084287 A1* | 4/2012 | Lakshminarayan | ........................ |
| | | | G06F 16/24545 |
| | | | 707/737 |
| 2016/0026667 A1* | 1/2016 | Mukherjee | G06F 16/278 |
| | | | 707/714 |
| 2016/0350375 A1* | 12/2016 | Das | G06F 11/34 |
| 2018/0095795 A1* | 4/2018 | Hebert | G06F 9/4812 |

* cited by examiner

FIG. 1A

| 0 | SELECT STATEMENT |
| 1 | SORT AGGREGATE |
| 2 | PX COORDINATOR |
| 3 | PX SEND QC (RANDOM) |
| 4 | SORT AGGREGATE |
| 5 | HASH JOIN |
| 6 | PART JOIN FILTER CREATE |
| 7 | PX RECEIVE |
| 8 | PX SEND BROADCAST |
| 9 | PX BLOCK ITERATOR |
| 10 | TABLE ACCESS FULL | |Employees| |
| 11 | PX BLOCK ITERATOR |
| 12 | TABLE ACCESS FULL | |Departments| |

FIG. 1B

| 0 | SELECT STATEMENT |
| 1 | SORT AGGREGATE |
| 2 | PX COORDINATOR |
| 3 | PX SEND QC (RANDOM) |
| 4 | SORT AGGREGATE |
| 5 | HASH JOIN |
| 6 | PART JOIN FILTER CREATE |
| 7 | PX RECEIVE |
| 8 | PX SEND BROADCAST |
| 9 | PX BLOCK ITERATOR |
| 10 | TABLE ACCESS FULL | |Employees| |
| 11 | PX BLOCK ITERATOR ADAPTIVE |
| 12 | TABLE ACCESS FULL | |Departments| |

ADAPTIVE GRANULE GENERATION FOR PARALLEL QUERIES WITH RUN-TIME DATA PRUNING

FIELD OF THE INVENTION

The present invention relates to query parallelism with run-time data pruning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many Database Management Systems (DBMS) are multi-node systems. Multi-node systems comprise multiple computing nodes, where each node may contain multiple processors, each running multiple concurrent processes. To fully utilize the computing power of a multi-node system, a DBMS may divide the task of executing a query into smaller subtasks, which may then be distributed to multiple processes running on one or more computing nodes. Because the subtasks are being performed in parallel by multiple processes which may be on multiple nodes, the execution of the query can be completed much faster than if the processing were performed by a single process.

A task that is divided into smaller subtasks that are executed by multiple processes is referred to herein as a distributed operation; each subtask may be referred to herein as a work granule. A DBMS typically executes a query as a distributed operation.

To execute a query as a distributed operation, the database server generates an execution plan and then executes the execution plan. An execution plan defines operations to be performed to execute a query and an order for performing the operations. Such operations are referred to herein as plan operations.

The execution plan divides many kinds of plan operations into work granules. When an execution plan is executed, each work granule is assigned to a "slave process" operating under control of a DBMS; some if not many of the work granules are performed in parallel by multiple slave processes.

After the optimizer determines the execution plan of a statement, a query coordinator process handles the parallelization of the statement. Parallelization is the process by which a query coordinator determines which operations can be performed in parallel and then stages slave processes to execute the statement.

At the start of query execution for a hash or merge join operation, the query coordinator examines the data objects involved with evaluating the query and generates work granules to be distributed to various slave processes. Run-time techniques such as bloom partition pruning can be utilized during query execution to filter out work granules from the workload that are superfluous and do not need to be processed by the slave processes.

Specifically, during execution of a hash join, a probe table is partitioned and work granules are assigned one or more partitions. The work granules are then assigned to slave processes, which may be executed in parallel. Before the probe table is scanned, a build table is scanned and a bloom bit vector is created by allocating one bit for each partition of the probe table and setting each respective bit based on whether the build table has rows that could possibly join with rows from each respective partition of the probe table.

Additionally, before the probe table is scanned, each slave process that is assigned a work granule will check the bloom filter to determine if the bit corresponding to the partition assigned to the respective slave process is set. If the bit is set to "1", the work granule will be processed by the assigned slave process. If the bit is set to "0", the work granule does not need to be executed and the assigned process will not execute the work granule.

Thus, due to some work granules being pruned at runtime by the bloom partition technique, some slave processes may be left sitting idle while other slave processes process large portions of a workload, causing execution skew and longer execution times than necessary.

The execution skew is aggravated if the workload is relatively large and the bloom pruning technique prunes the majority of the original work load. The leftover work after pruning will not fully occupy all available slave processes and the execution skew will slow query execution dramatically.

Thus, techniques are desired to decrease execution skew and execution time in context of techniques such as bloom partition pruning.

Discussed herein are approaches for improving computational efficiency for queries utilizing bloom partition pruning.

BRIEF DESCRIPTION OF THE DRAWINGS

In the drawings:

FIG. 1A is a diagram depicting a query execution plan that represents a query comprising a hash join between two tables.

FIG. 1B is a diagram depicting a query execution plan that represents a query comprising a hash join between two tables with adaptive granule generation.

DETAILED DESCRIPTION

Figure 2:
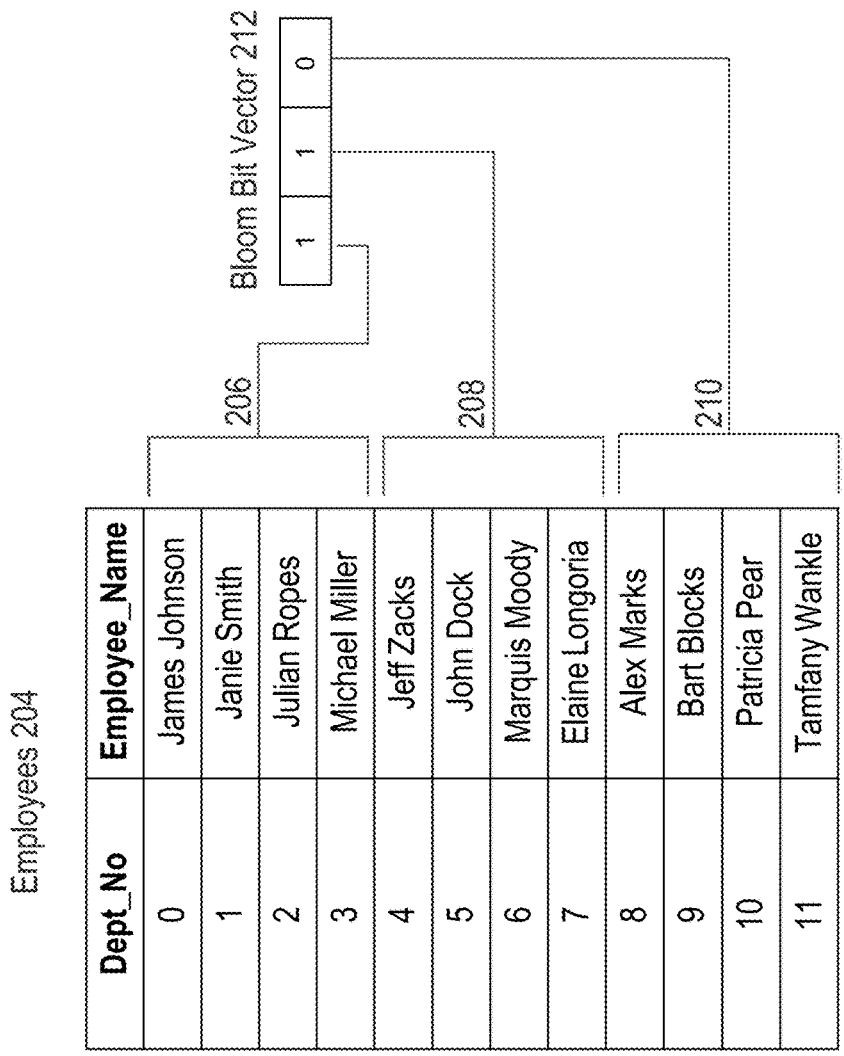
FIG. 2 illustrates tables and bloom bit vector from the execution plan depicted in FIG. 1A and FIG. 2A.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques herein improve computational efficiency for parallel queries with run-time data pruning by using adaptive granule generation. As described herein, bloom partition pruning techniques can be used to eliminate the superfluous processing of work granules for hash and/or merge joins.

Currently, for a query specifying a hash or merge join to be executed in parallel, the query workload must be distributed to parallel slave processes. Work granules can be cover one or more partitions of a table, or ranges of data blocks that hold data for a table.

Techniques such as bloom partition pruning are utilized to determine, before each table partition involved in the join is fully scanned, which partition includes rows that will not join with rows from another table. Work granules that only include rows from a table partition that will not join with rows from another table partition are pruned from execution, effectively reducing the overall work performed by the sum of the parallel slave processes.

However, although the overall work performed may be reduced by bloom partition pruning, bloom partition pruning may cause the distribution of a workload to a subset of available slave processes while other available slave processes are left idling because their assigned work was pruned. In this scenario, valuable parallel processing resources are left unused, resulting in execution skew and longer execution times than necessary.

In an improved technique of using adaptive granule generation, based on how many work granules are left after pruning, work granules can be re-generated so that each available slave process can be assigned some work. The overall efficiency of a query parallelization operation may benefit from regenerating the work granules so that the regenerated work granules can be redistributed among slave processes and executed in parallel.

Bloom Partition Pruning

According to an embodiment of the present invention, a DBMS uses bloom partition pruning techniques to eliminate the superfluous processing of partitions and work granules for hash and/or merge joins. To describe how a DBMS uses bloom partition pruning to eliminate unnecessary processing, it is useful to describe how a DBMS evaluates a database statement and statement operators contained therein.

To execute a query, a query optimizer of a DBMS may generate one or more different candidate execution plans for the query, which are evaluated by the query optimizer to determine which execution plan should be used to compute the query.

A query execution plan defines operations for computing a query. An execution plan may be represented by a directed graph of interlinked nodes, referred to herein as execution plan operators or plan operators, that each corresponds to an operation or function of the execution plan. The hierarchy of the graph (i.e., directed tree) represents the order in which the execution plan operations are performed and how data flows (e.g. rows) between each of the execution plan operations.

An execution plan operator may generate a set of rows as output. There are execution plan operators for performing operations such a table scan, sort-merge join, nested-loop join, or filter operation. For example, a table scan plan operator may scan rows in a database table and return the rows to a filter plan operator. The filter plan operator may filter rows that satisfy a predicate condition in a query that requires that a column have a certain value, returning rows that have the certain value in the column.

For example, consider a parallel query execution plan such as FIG. 1A that represents a query comprising a hash join between two tables. In general, the hash join executes in two phases: build and probe. During the build phase, all rows from the first input (often called the left or build input) are scanned, the rows are hashed on the join keys, and an in-memory hash table is created. During the probe phase, all rows from the second input (often called the right or probe input) are scanned, the rows are hashed on the same join keys, and matching rows in the hash table are probed. A query optimizer may assign the build input and probe input so that the smaller of the two inputs is the build input.

Referring now to FIG. 1A, the query optimizer chooses the "Departments" table, illustrated graphically in FIG. 2 as Departments 202, as the build input with a join key column entitled "Dept No". The query optimizer chooses the "Employees" table, illustrated graphically in FIG. 2 as Employees 204, as the probe input with a join key column entitled "Dept No". The Employees 204 table is split into three separate partitions 206, 208, 210 on the "Dept Number" column of the Employees 204 table. Each partition 206, 208, 210 includes four rows of the Employees 204 table.

Slave processes assigned by the query coordinator to execute the first table scan operator entitled "TABLE ACCESS FULL" from FIG. 1A will perform a full scan of the Departments 202 table during execution. Based on the data returned by the scan, the execution plan operator entitled "PART JOIN FILTER CREATE" from FIG. 1A creates a bloom bit vector 212, as shown in FIG. 2. A bloom bit vector 212 is a space-efficient probabilistic data structure that can be used to test whether an element is a member of a set or not. In this example, a bloom bit vector 212 is created by the "PART JOIN FILTER CREATE" operator from FIG. 1A with a separate bit allocated for each partition 206, 208, 210 of the Employees 204 table.

Each bit of the bloom bit vector 212 is set to a "1" or a "0" based on whether there could possibly be rows from the join column "Dept No" of the Departments 202 table that will join with rows from each of the partitions 206, 208, 210 from the Employees 204 table. For example, the first two rows of the Departments 202 table, identified by "1" and "2" from the "Dept No" column, will join with rows "1" and "2" from the "Dept No" column in the Employees 204 table. Thus, the bloom bit for the first partition 206 of the Employees 204 table is set to "1", as shown in the bloom bit vector 212. The third, fourth, and fifth rows from the Departments 202 table, identified by "5", "6", and "7" from the "Dept No" column, will with join with rows "5", "6", and "7" from the "Dept No" column in the Employees 204 table. Thus, because rows "5", "6", and "7" of the Employees 204 table belong to the second partition 208, the bloom bit for the second partition 208 of the Employees 204 table is set to "1", as shown in the bloom bit vector 212. In this example, there are no rows from the Departments 202 table that will join with a row from the third partition 210 of the Employees 204 table. Thus, the bloom bit for the third partition 210 is set to "0", as shown in the bloom bit vector 212.

Thus, the bloom bit vector can be used to determine whether there are rows from the Departments 202 table that correspond to one of the partitions from the Employee 204 table.

Before the bloom bit vector is created and populated with values, the query coordinator has already examined the data objects involved with evaluating the query and has generated work granules to be distributed to various slave processes. A work granule may comprise an entire partition, or the granule may comprise a portion of a partition. In context of the above example, both the Employees 204 table and Departments 202 table were already divided into a certain number of granules before the bit vector was generated and populated.

The query coordinator will assign the generated work granules to different slave processes to complete the execution of the hash join. Before executing the scan of the probe table, the Employees 204 table from the above example, each slave process that is assigned a work granule by the query coordinator will associate each work granule with a partition 206, 208, 210 and check the bloom bit vector 212 to determine if the bit corresponding to the partition is set. If the bit is set to "1", the work granule will be processed by the slave process. If the bit is set to "0", the work granule does not need to be executed and the slave process will not execute the work granule and perform no effective work.

For example, any slave process that is assigned a work granule corresponding to the first and second partitions 206, 208 of the Employees 204 table will check the bloom bit vector and determine that the bits corresponding to each partition 206, 208 are set to "1". In response, slave processes assigned work granules corresponding to the first and second partitions 206, 208 will process and execute the respective work granules. Any slave process that is assigned a work granule corresponding to the third partition 210 of the Employees 204 table will check the bloom bit vector and determine that the bit corresponding to the third partition 210 is set to "0". In response, slave processes assigned work granules corresponding to the third partition 210 will not execute the assigned work granules and send a request to the query coordinator for a different work granule.

In this example, the third partition of the probe table is pruned, and the rows from the probe table corresponding to the pruned partition will not be scanned. As discussed above, all slave processes that receive work granules belonging to pruned partitions perform no effective work. Each slave process will check the bloom filter to see if the assigned work granule belongs to a pruned partition. If yes, the slave process will refuse to execute the work granule and send a request to the query coordinator for a next work granule.

Because the work granules for the Employees 204 probe table are generated earlier in execution without the knowledge of the bloom bit vector, slaves that are assigned work granules corresponding to a pruned partition will perform no effective work while slaves that are assigned work granules corresponding to a non-pruned partition will process and execute the assigned work granules.

Figure 3:
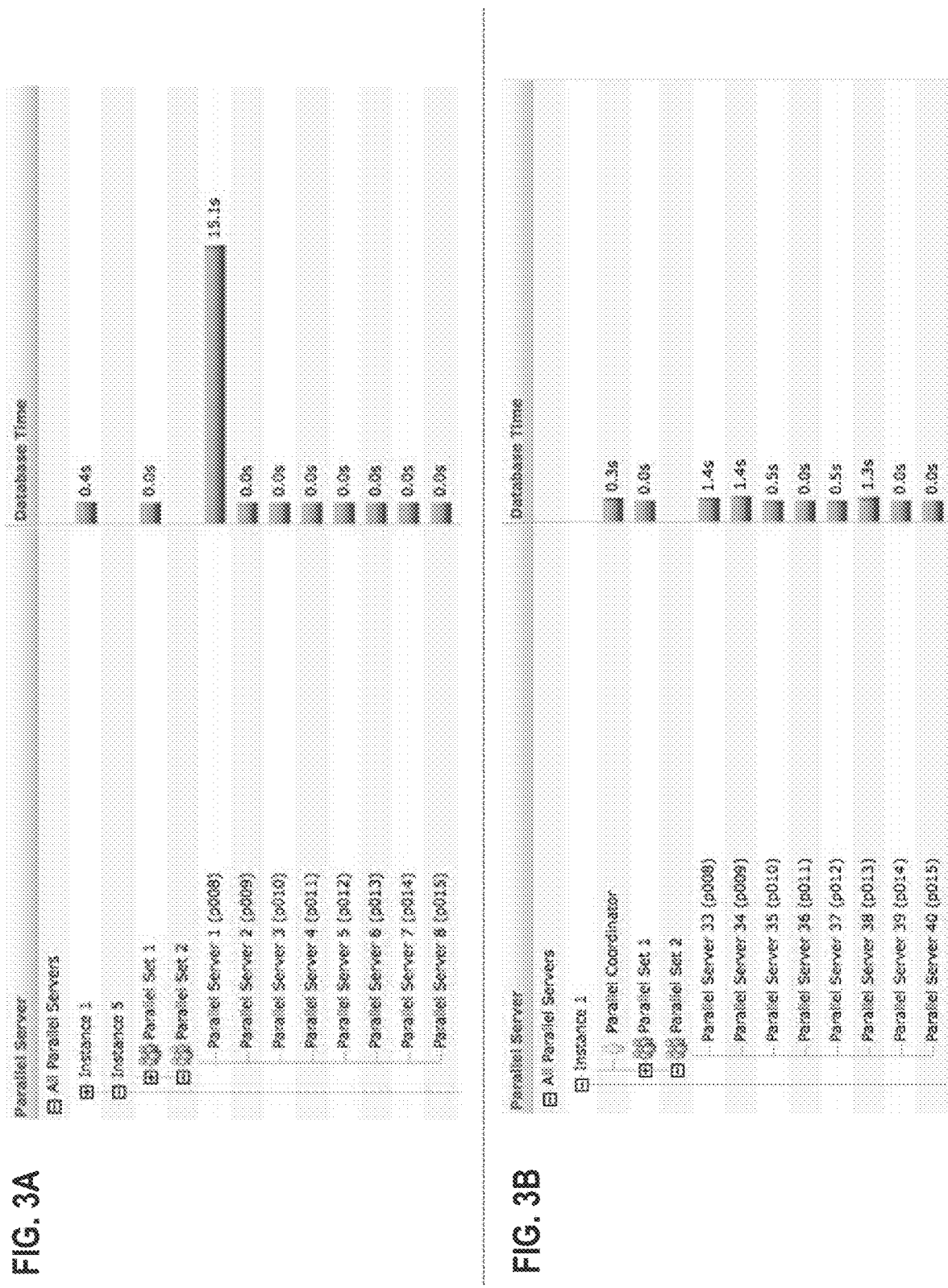
FIG. 3A illustrates parallel server execution statistics for granule generation with runtime pruning.
FIG. 3B illustrates parallel server execution statistics for granule generation with adaptive runtime pruning.

FIG. 3A illustrates parallel server execution statistics for granule generation with runtime pruning. FIG. 3A shows the estimated database time for a plurality of slave processes to execute assigned work granules. Each parallel server p009-p015 represents a slave process that was assigned work granules corresponding to partition that was pruned. "Parallel Server 1 (p008)" represents a slave process that was assigned a work granule corresponding to a non-pruned partition. As shown, "Parallel Server 1 (p008)" is the only slave process from p008-p015 that will execute any effective work, denoted by the 15.1 seconds of estimated database time to process the assigned granules. Parallel servers p009-p015 perform no effective work because the granules they were assigned were pruned by the bloom partition pruning technique, as described above. Although bloom partition pruning is effective to reduce the total amount of work performed by a group of slave processes, the leftover work does not fully occupy all available parallel slave processes and the execution skew results in a longer execution time than necessary.

Adaptive Granule Generation with Runtime Data Pruning

An improvement to the approach of using bloom partition pruning at runtime to eliminate execution skew includes the process of regenerating work granules so that each available slave process is assigned a portion of a workload, resulting in a more evenly distributed workload.

As discussed above, slave processes executing work granules associated with the probe side of a hash join use a bloom bit vector to avoid executing work granules that are associated with pruned partitions. In an improved technique, the bloom bit vector is applied by the query coordinator instead of the slave processes. Initially, the query coordinator has a list of work granules that need to be distributed to slave processes at execution time. The query coordinator applies the bloom pruning using the bloom bit vector to prune out all the work granules which belong to partitions that do not have the corresponding bit set in bloom filter. Based on how many work granules are left after pruning, the query coordinator decides whether or not to regenerate smaller work granules so that each available slave process can be assigned some work. If the number of work granules left after pruning includes enough work granules to keep all the slave processes busy, then regeneration of the work granules is not needed. Otherwise, the overall efficiency of a query parallelization operation may benefit from regenerating the work granules so that the regenerated work granules can be redistributed among slave processes and executed in parallel.

Figure 4:
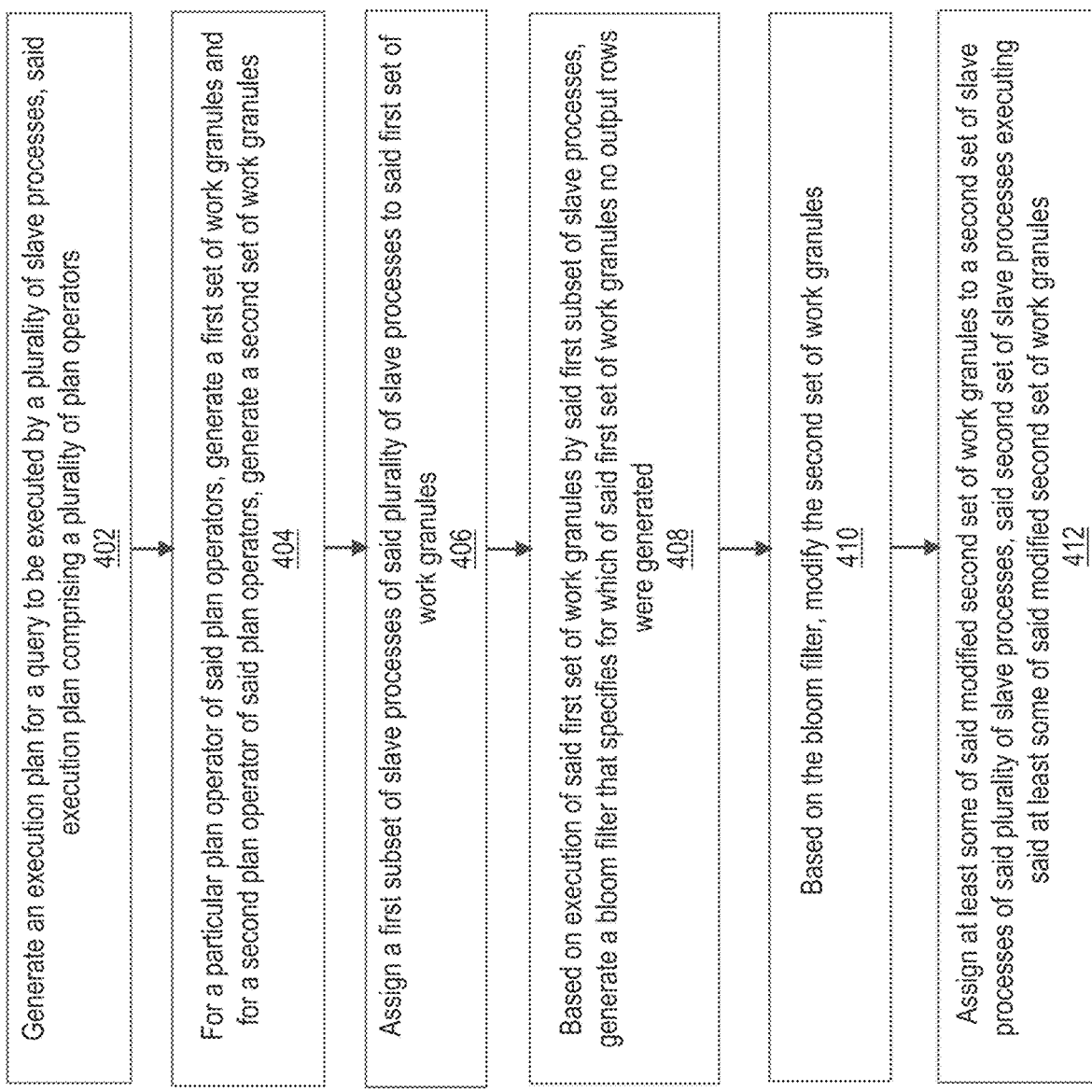
FIG. 4 is a flow chart depicting an example process for using adaptive granule generation for parallel queries with run-time data pruning.

FIG. 4 illustrates an example process for using adaptive granule generation for parallel queries with run-time data pruning.

At step 402, an execution plan is generated for a query to be executed by a plurality of slave processes, said execution plan comprising a plurality of plan operators. The execution plan may include plan operators comprising a hash join or a merge join.

At step 404, for a first plan operator of said plan operators, a first set of work granules are generated, and for a second plan operator of said plan operators, a second set of work granules are generated. For example, the query coordinator may examine data structures such as tables that are included in the execution plan and generate work granules. The first set of work granules may be associated with a table scan operator that scans a first table. The second set of work granules may be associated with a table scan operator that scans a second table.

At step 406, a first subset of slave processes of said plurality of slave processes is assigned to said first set of work granules. For example, the query coordinator will assign the first set of work granules to a first subset of slave processes for processing and execution. In an embodiment, the first set of work granules are associated with a build phase of a hash join.

In an embodiment, an additional subset of slave processes of said plurality of slave processes is assigned to said second set of work granules. The second set of work granules are associated with a probe phase of a hash join.

At step 408 based on execution of said first set of work granules by said first subset of slave processes, a bloom filter is generated that specifies for which of said first set of work granules no output rows were generated. The bloom filter comprises a bloom bit vector. The bloom bit vector is generated by allocating one bit for each partition of a probe table and setting each bit of the vector based on whether the first set of work granules produce output rows that correspond to a partition of the probe table, as described herein in the "Bloom Partition Pruning" section.

At step 410, based on the bloom filter, the second set of work granules are modified. The query coordinator regenerates or modifies the second set of work granules based on bits set in the bloom bit vector.

In an embodiment, based on the bloom filter, it is determined that one or more slave processes of said plurality of slave processes assigned to execute the second set of work granules will not execute the assigned work granules. In response to determining that one or more slave processes of said plurality of slave processes assigned to execute the second set of work granules will not execute the assigned work granules, the second set of work granules are modified. The second set of work granules are modified to ensure that each available slave process of the plurality of slave processes will be assigned one or more work granules from the second set of work granules at execution time.

In an embodiment, the modified second set of work granules are of a different type than the unmodified second set of work granules. The type of work granules generated for an object depends on heuristics such as the size and number of partitions of the object. Thus, the modified work granules can have a different type than the originally generated granules because of run-time pruning. Different types of work granules include partition work granules and block range work granules. These types of work granules differ by the level of granularity these types work granules specify data blocks to process. Partition work granules are work granules assigned one or more entire partitions of tables or indexes. Partitions are described in U.S. patent application Ser. No. 15/228,831 and U.S. Pat. No. 7,814,104, herein incorporated by reference in entirety. Block range work granules are assigned address ranges of physical data blocks from a file that stores table data.

In an embodiment, the modified second set of work granules are of a different size than the unmodified second set of work granules. For example, the execution plan illustrated in FIG. 1B specifies a plan operator "PX BLOCK ITERATOR ADAPTIVE". Due to being adaptive, the modified work granules may change sizes.

For example, in the case where the unmodified second set of work granules comprise partition work granules, it is possible that after bloom partition pruning, the only work granule left in the unmodified second set of work granules is a single partition work granule. Because partition work granules span entire partitions of tables or indexes, the entire partition work granule will be assigned to be executed by a single slave process, leaving available slave processes with no effective work to perform.

The improvement of allowing adaptation of work granule type allows partition work granules to be regenerated as block range work granules and split into smaller work granules. In this scenario, the partition work granule is modified by splitting the partition work granule into a plurality of block range work granules. The type of the work granules is modified so that smaller work granules can be created from one large work granules so that the workload can be distributed among all the available slave processes.

For example, if a plurality of block range work granules are adapted, the new granules may continue to be block range granules with each block range granule having a smaller size than the original. In another example, if a plurality of partition work granules are adapted, the new granules can change type to partition granules with fewer table partitions or the new granules can change type to block-range granules.

At step 412, at least some of said modified second set of work granules are assigned to a second set of slave processes of said plurality of slave processes, said second set of slave processes executing said at least some of said modified second set of work granules.

After the work granule modification as discussed in step 410, the query coordinator has enough work granules to distribute to all available slave processes. FIG. 3B illustrates parallel server execution statistics for adaptive granule generation with runtime pruning. Similar to FIG. 3A, FIG. 3B shows the estimated database time for a plurality of slave processes to execute assigned work granules. In FIG. 3B, each parallel server p008-p015 represents a slave process that was assigned a modified work granule, as discussed in step 412.

In comparison to FIG. 3A, FIG. 3B shows a more balanced distributed workload with a reduced overall execution time. With multiple slave processes (p008-p015) performing work, the elapsed time of the query is improved from an estimated 15 seconds, as shown in FIG. 3A, to less than 2 seconds, as shown in FIG. 3B. Thus, the result of the adaptive granule generation is an even distribution of a workload among a plurality of slave process, eliminating execution skew and improving execution time.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 5:
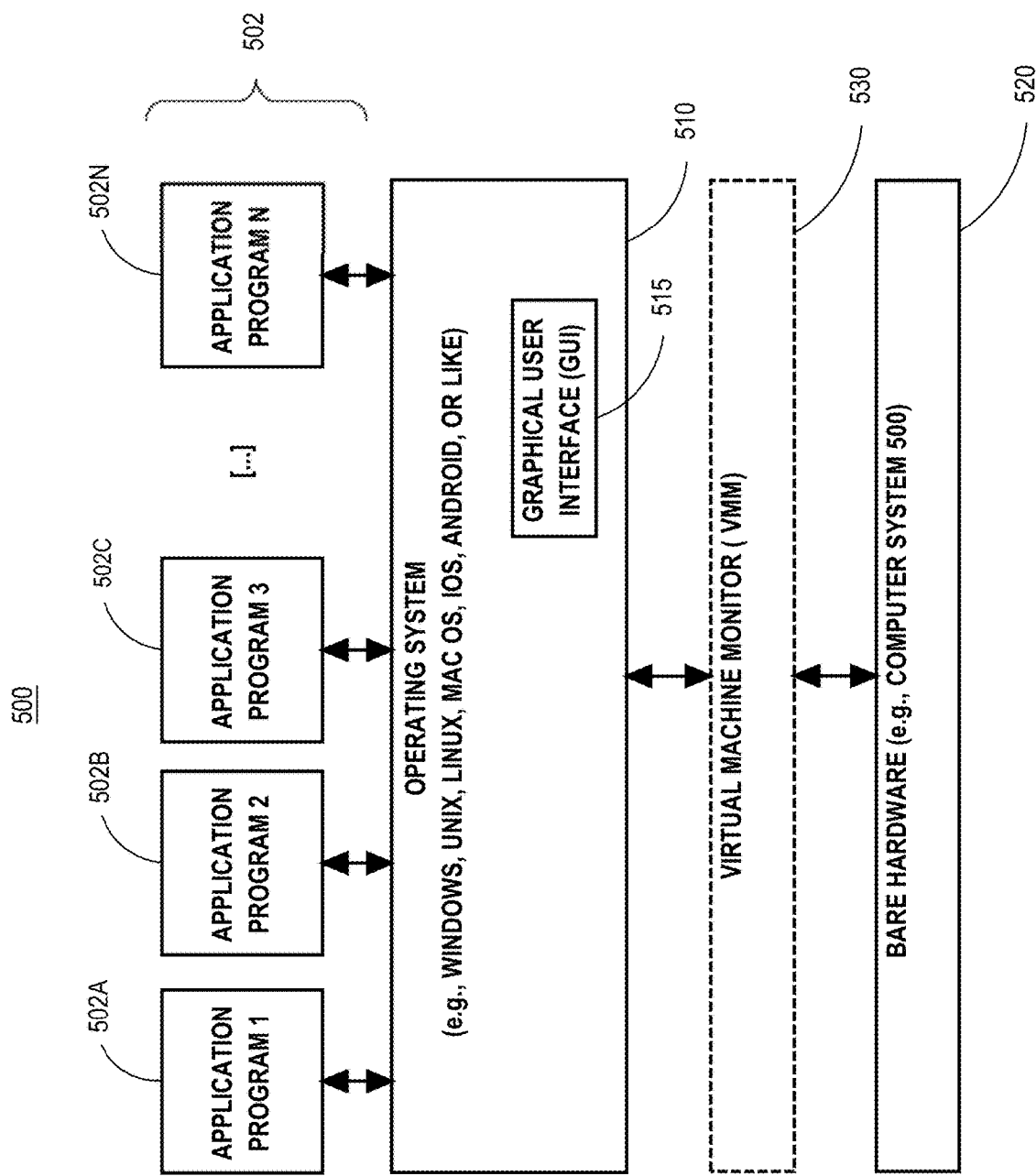
FIG. 5 is a diagram depicting a software system upon which an embodiment of the invention may be implemented.
Figure 6:
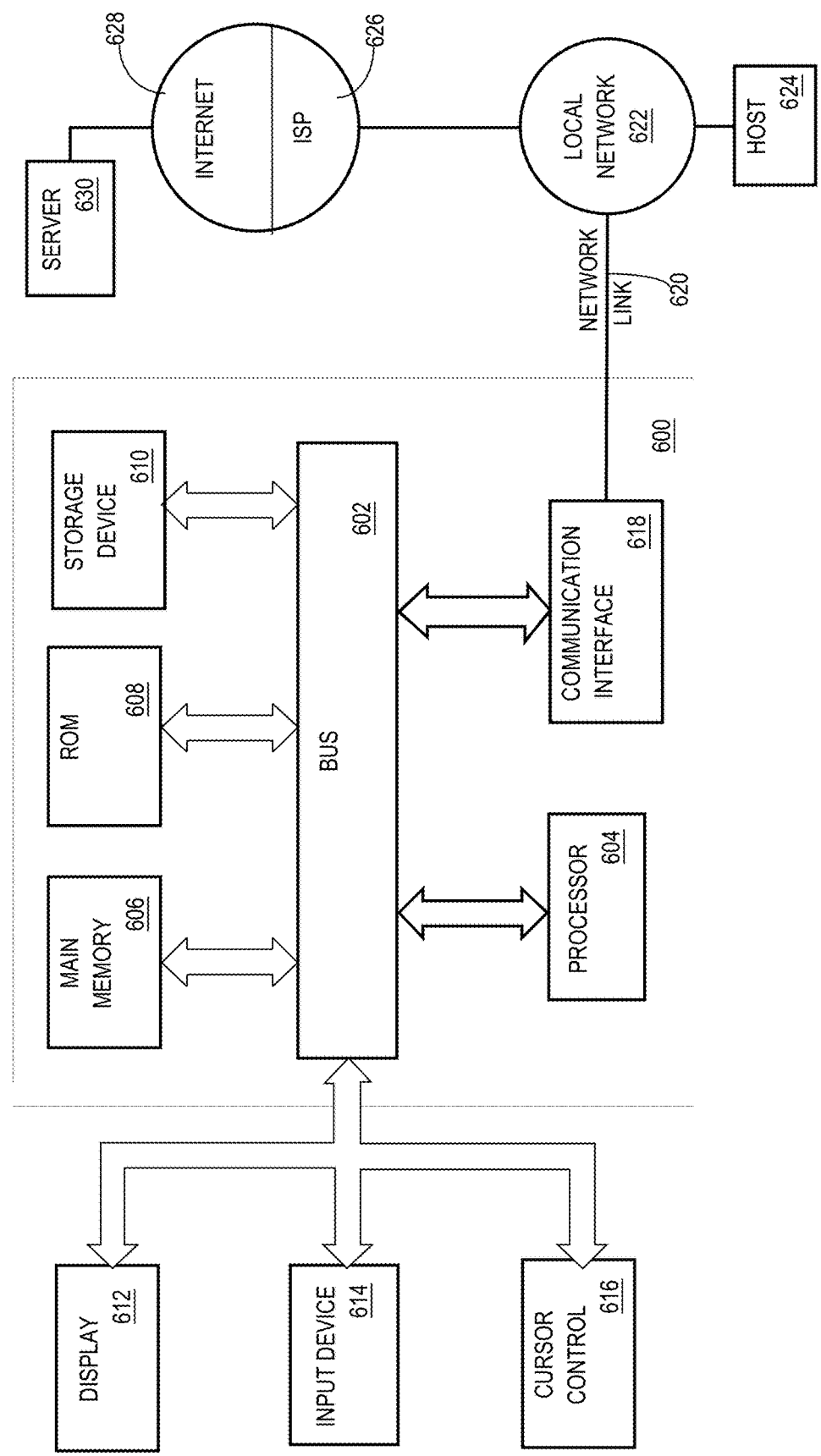
FIG. 6 is a diagram depicting a computer system that may be used in an embodiment of the present invention.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 402 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    generating an execution plan for a query to be executed by a plurality of slave processes, said execution plan comprising a plurality of plan operators;
    for a first plan operator of said plurality of plan operators, generating a first set of work granules, and for a second plan operator of said plurality of plan operators, generating a second set of work granules assigned to a plurality of partitions, each work granule of said second set of work granules being assigned to one or more of said plurality of partitions;
    assigning to a first subset of slave processes of said plurality of slave processes said first set of work granules;
    based on execution of said first set of work granules by said first subset of slave processes, making a determination that one or more partitions of said plurality of partitions may be pruned;
    based on said determination that one or more partitions of said plurality of partitions may be pruned, modifying a size of one or more work granules of said second set of work granules; and
    after modifying a size of one or more work granules of said second set of work granules, assigning said one or more work granules of said second set of work granules to a second subset of slave processes of said plurality of slave processes.

2. The method of claim 1, wherein said plurality of plan operators include a hash join operator or a merge join operator.

3. The method of claim 1, wherein said first set of work granules is associated with one or more table scan operators.

4. The method of claim 1, wherein said first set of work granules is associated with a build phase of a hash join and said second set of work granules is associated with a probe phase of the hash join.

5. The method of claim 4, wherein making said determination that one or more partitions of said plurality of partitions may be pruned includes generating a bloom filter that indicates which of said plurality of partitions contains no rows that would join with a row in a build table of said build phase.

6. The method of claim 1, wherein making said determination that one or more partitions of said plurality of partitions may be pruned includes generating a bloom filter that indicates which of said second set of work granules would generate no output rows.

7. The method of claim 1, wherein said modifying a size of one or more work granules includes altering a number of partitions of said plurality of partitions assigned to said one or more work granules.

8. The method of claim 1, wherein said modifying a size of one or more work granules includes modifying a respective block range assigned to each of said one or more work granules.

9. The method of claim 1, wherein each available slave process of the second subset of slave processes is assigned at least one work granule from the second set of work granules.

10. A non-transitory computer-readable storage medium storing instructions that, when executed by one or more processors, cause the one or more processors to perform:
    generating an execution plan for a query to be executed by a plurality of slave processes, said execution plan comprising a plurality of plan operators;
    for a first plan operator of said plurality of plan operators, generating a first set of work granules, and for a second plan operator of said plurality of plan operators, generating a second set of work granules assigned to a plurality of partitions, each work granule of said second set of work granules being assigned to one or more of said plurality of partitions;
    assigning to a first subset of slave processes of said plurality of slave processes said first set of work granules;

based on execution of said first set of work granules by said first subset of slave processes, making a determination that one or more partitions of said plurality of partitions may be pruned;

based on said determination that one or more partitions of said plurality of partitions may be pruned, modifying a size of one or more work granules of said second set of work granules; and after modifying a size of one or more work granules of said second set of work granules, assigning said one or more work granules of said second set of work granules to a second subset of slave processes of said plurality of slave processes.

11. The non-transitory computer-readable storage medium of claim 10, wherein said plurality of plan operators include a hash join operator or a merge join operator.

12. The non-transitory computer-readable storage medium of claim 10, wherein said first set of work granules is associated with one or more table scan operators.

13. The non-transitory computer-readable storage medium of claim 10, wherein said first set of work granules is associated with a build phase of a hash join and said second set of work granules is associated with a probe phase of the hash join.

14. The non-transitory computer-readable storage medium of claim 13, wherein making said determination that one or more partitions of said plurality of partitions may be pruned includes generating a bloom filter that indicates which of said plurality of partitions contains no rows that would join with a row in a build table of said build phase.

15. The non-transitory computer-readable storage medium of claim 10, wherein making said determination that one or more partitions of said plurality of partitions may be pruned includes generating a bloom filter that indicates which of said second set of work granules would generate no output rows.

16. The non-transitory computer-readable storage medium of claim 10, wherein said modifying a size of one or more work granules includes altering a number of partitions of said plurality of partitions assigned to said one or more work granules.

17. The non-transitory computer-readable storage medium of claim 10, wherein said modifying a size of one or more work granules includes modifying a respective block range assigned to each of said one or more work granules.

18. The non-transitory computer-readable storage medium of claim 10, wherein each available slave process of the second subset of slave processes is assigned at least one work granule from the second set of work granules.

* * * * *